United States Patent
Hessling, Jr.

(10) Patent No.: US 9,906,270 B2
(45) Date of Patent: Feb. 27, 2018

(54) CONCURRENT OUTBOUND COMMUNICATIONS IN A TWACS

(71) Applicant: Aclara Technologies LLC, Hazelwood, MO (US)

(72) Inventor: John B. Hessling, Jr., Hazelwood, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 15/079,374

(22) Filed: Mar. 24, 2016

(65) Prior Publication Data

US 2016/0285510 A1  Sep. 29, 2016

Related U.S. Application Data

(60) Provisional application No. 62/138,715, filed on Mar. 26, 2015.

(51) Int. Cl.
| | |
|---|---|
| *H04L 27/00* | (2006.01) |
| *B60B 37/00* | (2006.01) |
| *H04B 3/54* | (2006.01) |
| *H04B 1/04* | (2006.01) |

(52) U.S. Cl.
CPC ............ *H04B 3/54* (2013.01); *H04B 1/04* (2013.01); *H04B 2203/5466* (2013.01)

(58) Field of Classification Search
CPC .... H04B 3/54; H04B 3/56; H04B 2203/5425; H04B 2203/5458; H04B 5/0031; H04B 7/0413; H04B 1/04; H04B 10/11; H04B 15/00; H04B 1/0475; H04B 1/10; H04B 2001/0408; H04B 3/38

USPC ............................................... 375/259; 301/1
See application file for complete search history.

(56) References Cited

U.S. PATENT DOCUMENTS

| | | | | |
|---|---|---|---|---|
| 4,559,520 | A * | 12/1985 | Johnston ................ | H04B 3/542 340/12.33 |
| 5,283,572 | A * | 2/1994 | McClelland ............. | H04Q 9/00 340/870.02 |
| 5,933,072 | A * | 8/1999 | Kelley ..................... | H04B 3/14 307/1 |
| 6,940,396 | B2 | 9/2005 | Hammond et al. | |
| 6,965,319 | B1 * | 11/2005 | Crichlow ................ | H04Q 9/00 340/870.02 |
| 7,010,363 | B2 * | 3/2006 | Donnelly ................. | H02J 3/14 137/387 |
| 7,227,462 | B2 | 6/2007 | Spencer | |
| 7,312,693 | B2 | 12/2007 | Soni | |
| 7,496,430 | B2 | 2/2009 | Mak | |
| 7,733,245 | B2 | 6/2010 | Spencer | |

(Continued)

*Primary Examiner* — Sam K Ahn
*Assistant Examiner* — Sarah Hassan
(74) *Attorney, Agent, or Firm* — Polster, Lieder, Woodruff & Lucchesi, LC

(57) ABSTRACT

An improvement in a Two Way Automated Communications System (TWACS) requires only three of six previously required vectors to communicate with remote communication equipment (RCE) devices installed in the three phases of a utility's low voltage distribution network for concurrent outbound signal communications over the TWACS. The reduction in vectors allows an outbound injection silicon-controlled rectifier (SCR) array used for such purposes to be greatly simplified and further allows the SCRs in the array to be operated independently, and therefore concurrently.

5 Claims, 6 Drawing Sheets

Outbound SCR Array

(56) References Cited

U.S. PATENT DOCUMENTS

| | | |
|---|---|---|
| 7,831,884 B2 | 11/2010 | Spencer |
| 8,010,240 B2 | 8/2011 | Mattiocco et al. |
| 8,040,251 B2 | 10/2011 | Spencer |
| 8,325,057 B2 | 12/2012 | Salter |
| 8,331,955 B2 * | 12/2012 | Bull ..................... G01S 5/0205 455/456.1 |
| 8,401,093 B2 | 3/2013 | Spencer |
| 8,433,452 B2 | 4/2013 | Fleck et al. |
| 8,456,285 B2 | 6/2013 | Spencer |
| 8,542,720 B2 | 9/2013 | Spencer et al. |
| 8,761,271 B2 | 6/2014 | Spencer |
| 8,773,108 B2 | 7/2014 | Curt et al. |
| 8,897,923 B2 | 11/2014 | Haynes |
| 9,171,458 B2 | 10/2015 | Salter |
| 2005/0041026 A1 * | 2/2005 | Haynes .............. G05B 23/0272 345/440 |
| 2006/0190140 A1 * | 8/2006 | Soni ........................ H02J 3/14 700/295 |
| 2007/0018853 A1 * | 1/2007 | Soni ......................... G01D 3/08 340/870.17 |
| 2008/0040644 A1 * | 2/2008 | Spencer ................ H03M 13/09 714/758 |
| 2008/0174966 A1 * | 7/2008 | Badger ................ H02M 7/003 361/709 |
| 2013/0208830 A1 * | 8/2013 | Rieken .................... H04B 3/54 375/308 |

* cited by examiner

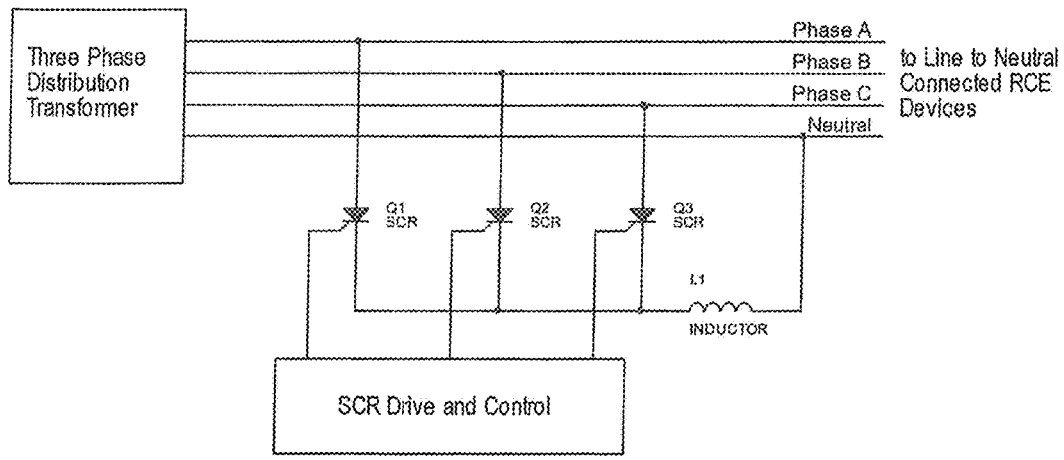
Figure 1, Outbound SCR Array

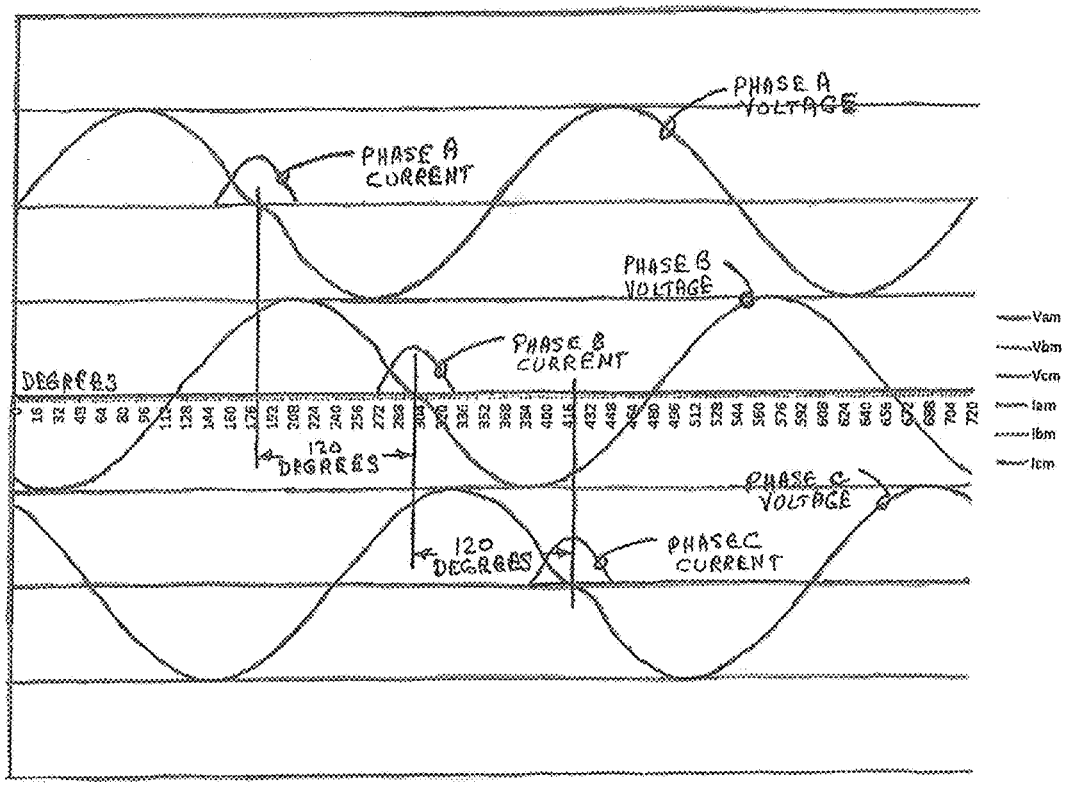
Figure 2, Vector Separation

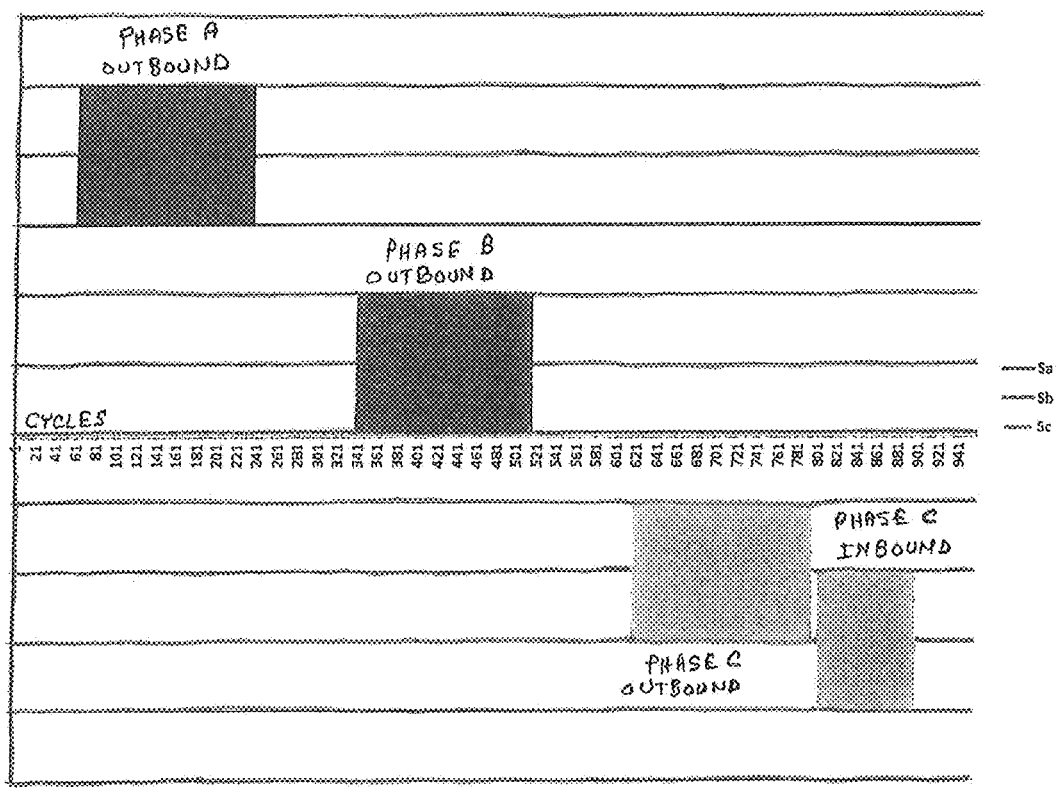
Figure 3, Sequential Search

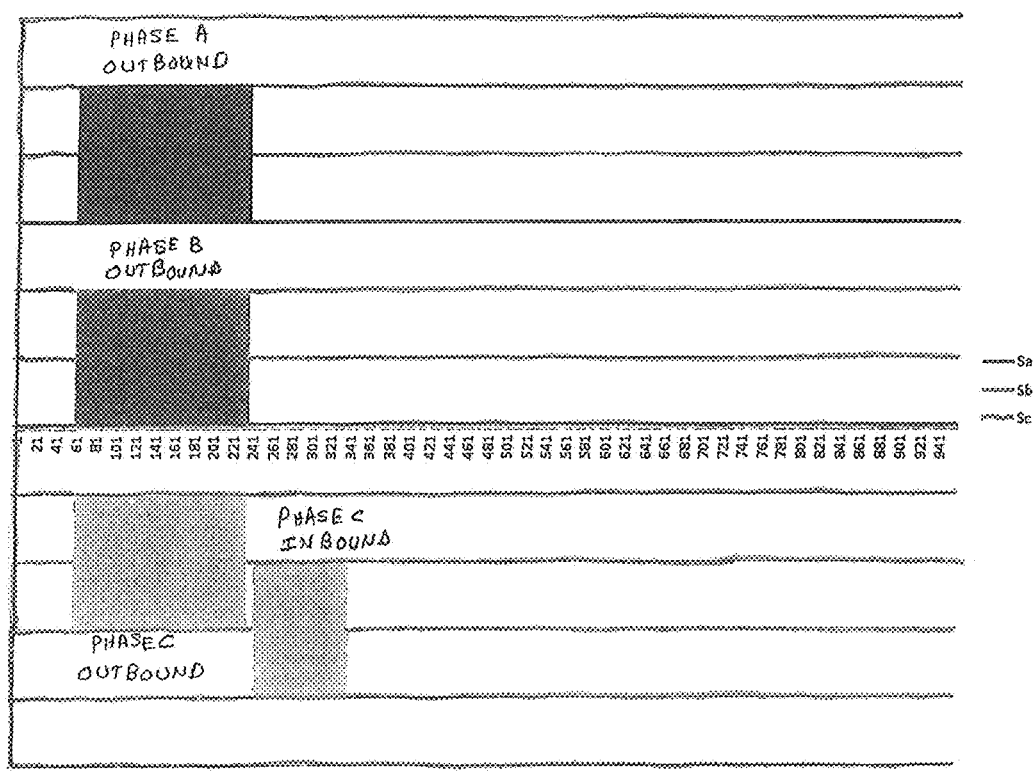
Figure 4, Concurrent Outbound Search

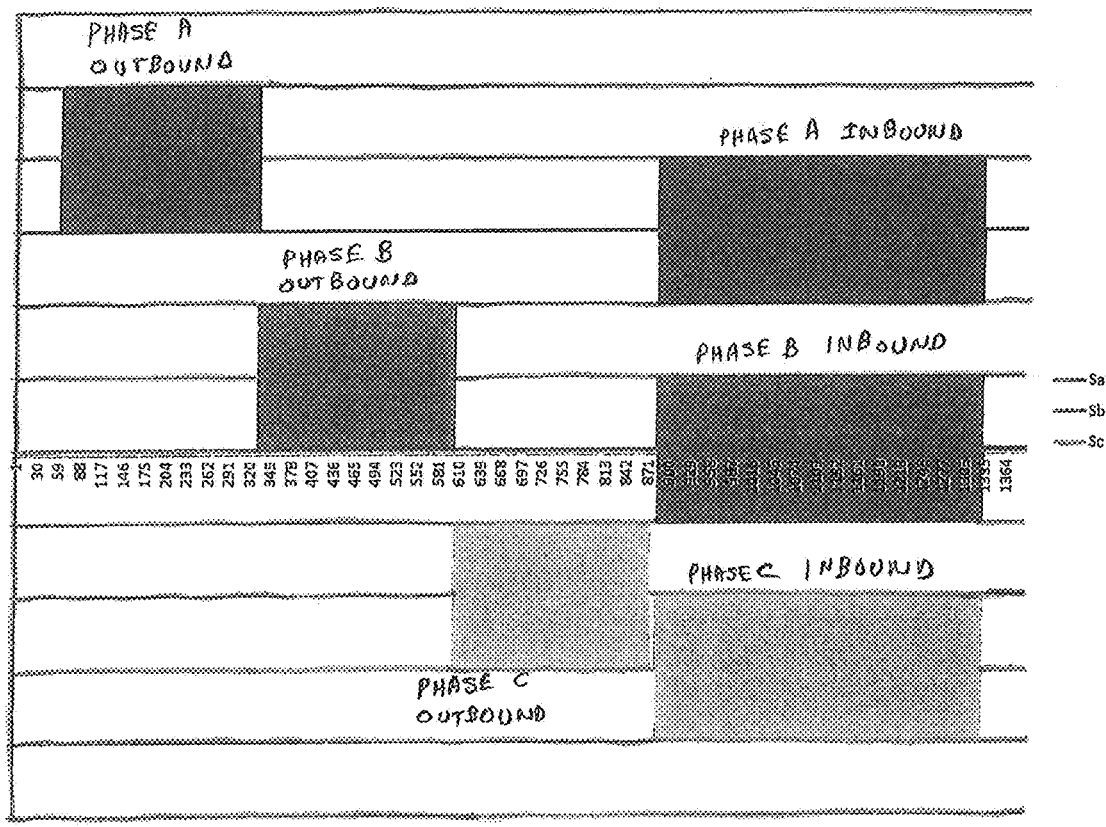
Figure 5, Meter Read with Sequential Outbound

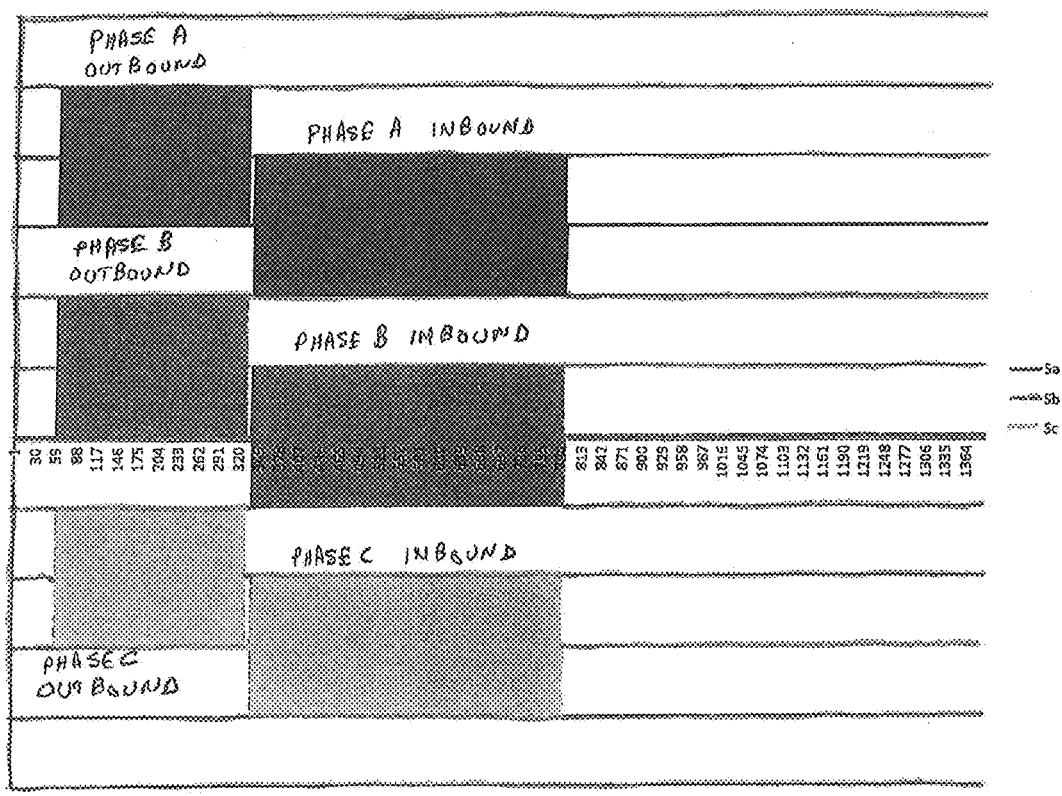
Figure 6, Meter Read with Concurrent Outbound

US 9,906,270 B2

CONCURRENT OUTBOUND COMMUNICATIONS IN A TWACS

CROSS REFERENCE TO RELATED APPLICATIONS

This application is based upon and claims the benefit of U.S. provisional patent application 62/138,715 filed Mar. 26, 2015.

STATEMENT REGARDING FEDERALLY SPONSORED RESEARCH OR DEVELOPMENT

N/A

BACKGROUND OF THE INVENTION

This invention relates to a Two-Way Automated Communications System (TWACS) used by electrical utilities to communicate between the utility and a customer site; and, more particularly, to concurrent outbound communications in a TWACS communications system.

In an electrical utility, a TWACS concurrent outbound signal injection scheme is employed to simultaneously route outbound communications on three phases of the voltage waveform propagating through the utility's low voltage distribution network. In this regard, a TWACS outbound signal is the "common language" used to describe a signal generated by Substation Control Equipment (SCE) utilized in the TWACS power-line communication system. The outbound signal is carried on an AC distribution voltage routed to remote locations (e.g., customer sites) and received by Remote Communication Equipment (RCE) installed at the remote location. Commands contained in an outbound signal cause the RCE to perform various tasks, one of which is transmitting a communication or signal back to the SCE. This response is referred to as an inbound signal or inbound communication.

SCE equipment installed at a power distribution substation uses expensive coupling transformers to inject an outbound signal into a waveform propagated through the utility's power distribution system, and to acquire and detect an inbound signal on the system's high voltage circuits. These circuits are typically 7 kV-35 kV circuits. Both the SCE and RCE have to transmit at relatively high current levels to produce a signal that can be detected at the other end of the power distribution system. In the system, there are usually a large number of RCE points per distribution substation. A distribution substation then typically feeds a large number of distribution transformers that step down the high voltage propagated through the power distribution system to low voltage levels necessary for customer use. And, while there are typically few RCE points per distribution transformer, this topology, which is common in the United States, suits the current TWACS implementation well.

However, in certain foreign countries and some domestic applications, the topology of a power distribution system is significantly different from the topology described above. In these applications, a power distribution system or network has many fewer distribution transformers and many more electrical utility customers per distribution transformer. In addition, the accessibility to install TWACS SCE equipment in the power distribution substations in some of these utilities can be severely limited.

BRIEF SUMMARY OF THE INVENTION

The present invention utilizes only three of the previously required six power system vectors (A-B, A-C, B-C, A-n, B-n, C-n) necessary to communicate with RCE devices installed in the three phases (A-n, B-n, C-n) of a utility's low voltage distribution network for the propagation of concurrent outbound signals communicated over a TWACS. This reduction in phase vectors, in turn, simplifies a silicon-controlled rectifier (SCR) array used in a distribution control unit (DCU) at a utility substation for generating outbound signals which are now generated concurrently rather than sequentially.

The present invention further improves a search process for determining which outbound signal transmission path for a RCE device provides the best results for signal reception for a valid inbound communication by a factor of three. Subsequent transmissions of outbound signals to individual RCE devices, or groups of RCE devices, and the receipt of resultant inbound communications is also improved by a factor of three.

Other objects and features will be in part apparent and in part pointed out hereinafter.

BRIEF DESCRIPTION OF THE DRAWINGS

FIG. 1 is a system diagram illustrating an outbound silicon-controlled rectifier (SCR) array;

FIG. 2 illustrates vector separation for the three phases;

FIG. 3 illustrates a sequential outbound search approach to determine which phase vector yields the best results for a valid inbound communication;

FIG. 4 illustrates a concurrent search approach to determine which phase vector yields the best results for a valid inbound communication;

FIG. 5 illustrates meter reading using sequential outbound communication signals; and, FIG. 6 illustrates a resulting meter reading capability using concurrent outbound communications.

Corresponding reference characters indicate corresponding elements throughout the several views of the drawings.

DESCRIPTION OF THE INVENTION

In accordance with the invention, an improvement to a TWACS communication system utilizes a distribution concentrator unit (DCU) located on the low voltage side of a power distribution network to communicate with a large number of RCE points per distribution transformer. Because a TWACS signal does not have to traverse an entire distribution network, from high voltage to low voltage, for outbound signals, and then back again for inbound signals, in order to produce an adequate signal for communications. An advantage of this approach is that the amplitude for a TWACS signal injected into the distribution network, in order produce an adequate signal for communications, is significantly reduced.

The normal method for injection the outbound signal uses a large coupling transformer together with a very high powered SCR array that can inject an outbound signal into only one of the six phase vectors (A-B, A-C, B-C, A-n, B-n, C-n) on the power system at a time. With the improvement of the present invention, only three of the six power system vectors (A-n, B-n, C-n) are required to communicate with RCE devices installed in the three phases of the utility's low voltage distribution network. This reduction from the six vectors to only phase-to-neutral vectors allows an outbound injection SCR array to be greatly simplified. See FIG. 1. Simplification of the SCR array, and the separation of vectors, now allows the SCRs in the array to be operated independently, and therefore concurrently. In this regard, and as shown in FIGS. 2-5, injected concurrent outbound signals are interleaved on the three phases (φA, φB, φC) by 120°.

To improve the throughput of the TWACS communication system for both searching devices and acquiring meter readings, it is desirable to perform as much of the communication as possible simultaneously all three of the phases of the power system.

In previous TWACS system implementations, an outbound signal was injected on one of the three phases and the SCE equipment would "listen" for a response on that phase. Each of the other phase vectors, in turn, would be similarly injected into the waveform and monitored. The results were then evaluated and the phase vector yielding the best results for a valid inbound communication would then be designated as the transmission path for the particular RCE device. This methodology was referred to as a search or sequential process and is shown in FIG. 3.

Now, an outbound signal is concurrently injected on all three phase vectors with all three phases of a subsequent inbound signal being received simultaneously. This inbound signal is evaluated and the phase producing the best signal reception for a valid inbound communication now determines the path for the particular RCE. It will be appreciated by those skilled in the art that this new signaling method improves the speed of the search process by a factor of three. See FIG. 4.

Also In previous TWACS system implementations, it was common that an outbound message be broadcast to all RCE devices with an inbound response not being requested. The outbound message would be injected first on one phase vector, and then on each of the other two phase vectors in turn. Now, using concurrent outbound injection in accordance with the present invention, an outbound signal is broadcast using all three phase vectors at the same time. Again it will be appreciated by those skilled in the art that this new signaling method improves the speed of the process by a factor of three.

Further in previous TWACS communication schemes, to have all three phases of an inbound signal occur simultaneously, the phase vectors of the TWACS outbound signal had to be injected sequentially, with appropriate delays being necessary between the outbound signaling and the subsequent inbound signaling. When performing functions requiring responses from RCE devices, a unique outbound message is formulated that simultaneously addresses groups of RCE devices on each of the three phases. This is as shown in FIG. 5. These unique outbound commands are now sent concurrently to individual RCE devices or to groups of RCE devices on each of the three phases with all the groups of RCE devices responding simultaneously. This is as shown in FIG. 6. This reduces the outbound communication time by a factor of three.

Based on the foregoing, the method of the present invention now allows a single search command (outbound signal) to be communicated on all three phases concurrently causing line-to-neutral connected RCE devices to respond to the to the concurrent outbound signal by identifying to which phase a device is connected. Also, in accordance with the method, concurrent outbound signals representing a broadcasted command are sent to all RCE devices on all three phases simultaneously. In addition, the method enables the acquisition of inbound communications from unique or individual RCE devices, or groups thereof, on each of the three phases as directed by an outbound communication sent to them.

In view of the above, it will be seen that the several objects and advantages of the present disclosure have been achieved and other advantageous results have been obtained.

What is claimed is:

1. In a two-way automated communications system (TWACS), a method of efficiently affecting concurrent outbound signal communications on all phases of a three power distribution network of a utility comprising:
generating an outbound communication signal to be transmitted on each phase of the power distribution network from a utility location to receiving sites located within the network;
simultaneously injecting the outbound communication signal on all the network phases for the outbound signal to be concurrently sent to each site, receiving equipment at each site receiving the outbound signal on each of the three phases and in response thereto, generating an inbound signal which is transmitted back to the utility location;
at the utility location, evaluating each inbound signal received from the receiving site of each phase and determining which phase resulted in the best inbound communication from that site, and,
subsequently concurrently transmitting outbound communication signals to the receiving sites on the particular phase for each respective site that exhibited the best signal reception for that site; and,
in which only three phase vectors rather than six phase vectors are used for communications between the utility location and the receiving site thereby enabling silicon-controlled-rectifiers (SCR) employed in an array thereof to be operated independently of each other so to affect concurrent outbound signal transmission over the network, the three vectors used being phase-to-neutral vectors and not phase-to-phase vectors.

2. The method of claim 1 in which outbound communications signal are generated at the utility location and transmitted to the receiving sites with the return inbound signals being transmitted from the receiving sites back to the utility location on a low voltage side of the power distribution network by which an amplitude of the signals injected into the network to produce adequate signals for communications is reduced.

3. The method of claim 1 in which injected concurrent outbound signals are interleaved on the three phases by 120°.

4. The method of claim 1 in which each receiving site includes receiving communications equipment connected to each phase of the distribution network so to receive outbound communications signals and transmit inbound communications signals on all phases of the network.

5. The method of claim 1 by which affecting concurrent outbound message signaling on all phases of the network simultaneously speeds up communications between the utility location and receiving cites by a factor of three.

* * * * *